(12) United States Patent
Hayashi

(10) Patent No.: US 10,534,163 B2
(45) Date of Patent: Jan. 14, 2020

(54) MICROSCOPE DEVICE, MICROSCOPE SYSTEM, AND ILLUMINATION DEVICE

(71) Applicant: OLYMPUS CORPORATION, Hachioji-shi, Tokyo (JP)

(72) Inventor: Shinichi Hayashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 238 days.

(21) Appl. No.: 15/824,399

(22) Filed: Nov. 28, 2017

(65) Prior Publication Data

US 2018/0231756 A1    Aug. 16, 2018

(30) Foreign Application Priority Data

Feb. 15, 2017    (JP) .................................. 2017-026475

(51) Int. Cl.
| | |
|---|---|
| G02B 26/08 | (2006.01) |
| G02B 21/08 | (2006.01) |
| G02B 26/10 | (2006.01) |
| G02B 21/00 | (2006.01) |
| G02B 26/12 | (2006.01) |
| G02B 21/36 | (2006.01) |

(52) U.S. Cl.
CPC ............ G02B 21/08 (2013.01); G02B 21/002 (2013.01); G02B 21/365 (2013.01); G02B 26/0816 (2013.01); G02B 26/0875 (2013.01); G02B 26/105 (2013.01); G02B 26/12 (2013.01)

(58) Field of Classification Search
CPC .. G02B 21/08; G02B 26/105; G02B 26/0875; G02B 21/002; G02B 26/12; G02B 21/365; G02B 26/0816; G02B 21/0032; G02B 5/09; G02B 5/10; G02B 21/367
USPC ....................................................... 359/212.2
See application file for complete search history.

(56) References Cited

U.S. PATENT DOCUMENTS

| | | | |
|---|---|---|---|
| 3,776,637 A | 12/1973 | Hecht | |
| 9,116,354 B2 * | 8/2015 | Knebel | ................ G02B 21/002 |
| 2012/0098949 A1 | 4/2012 | Knebel et al. | |
| 2012/0099190 A1 | 4/2012 | Knebel et al. | |
| 2015/0338628 A1 | 11/2015 | Knebel et al. | |

FOREIGN PATENT DOCUMENTS

| | | |
|---|---|---|
| CN | 104407436 A | 3/2015 |
| DE | 102010060121 A1 | 4/2012 |
| JP | 2012108491 A | 6/2012 |

* cited by examiner

*Primary Examiner* — Euncha P Cherry
(74) *Attorney, Agent, or Firm* — Holtz, Holtz & Volek PC

(57) ABSTRACT

A microscope device includes: an illumination optical system that has an illumination optical axis; and an observation optical system that has an observation optical axis. The illumination optical system includes a first scanning device that moves a condensing position in which the illumination light is condensed in a direction that is substantially parallel to the illumination optical axis. The first scanning device includes: a rotary mirror that includes a reflection surface; and a condenser lens that is arranged so as to irradiate the reflection surface with the illumination light and to receive the illumination light reflected by the reflection surface. The rotary mirror is rotationally moved or rotated in such a way that a distance between the condenser lens and the reflection surface on an optical axis of the condenser lens changes.

20 Claims, 19 Drawing Sheets

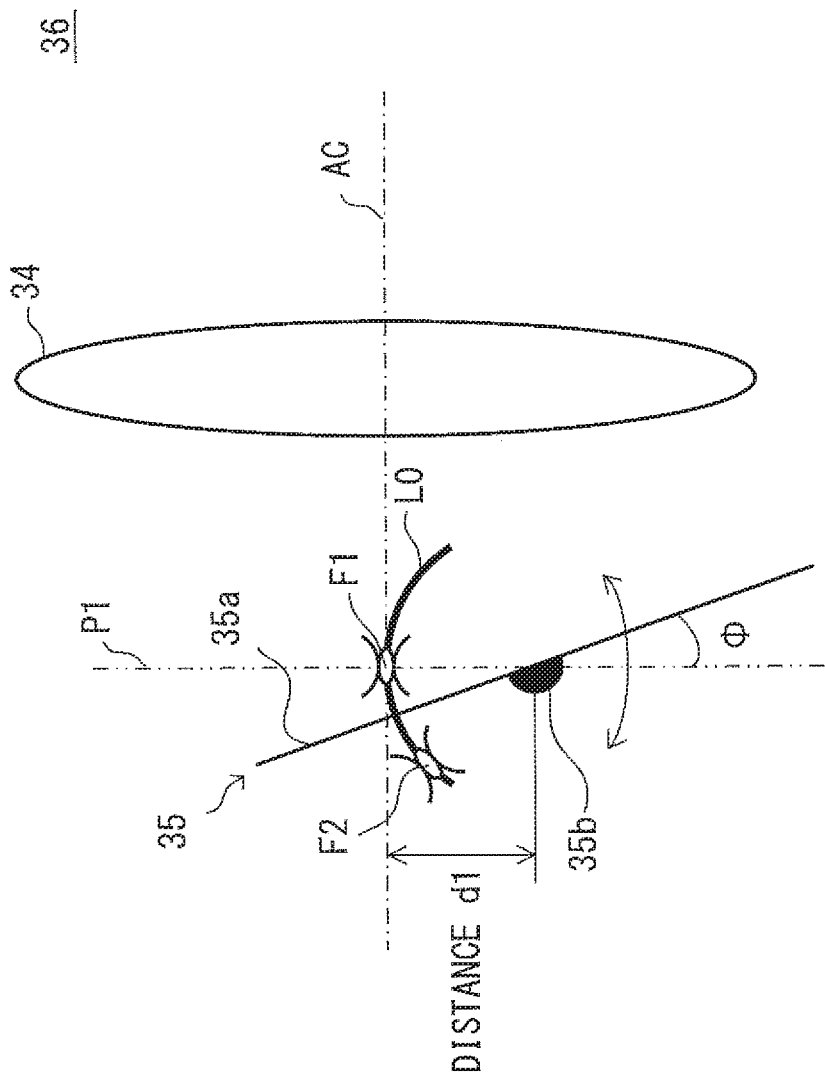
F I G. 4

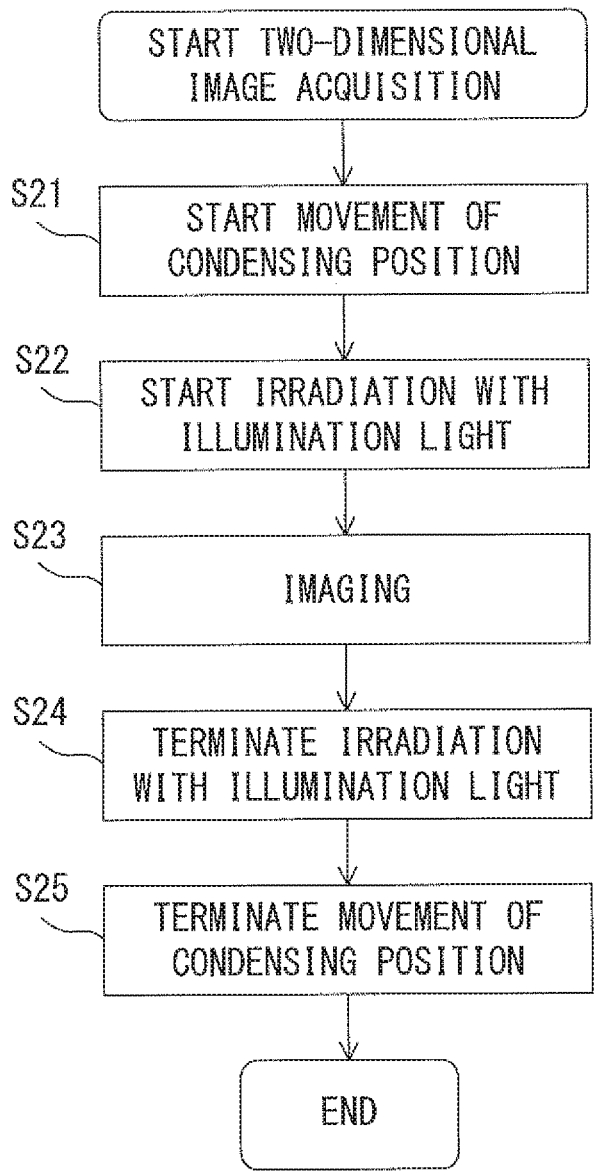
F I G. 7

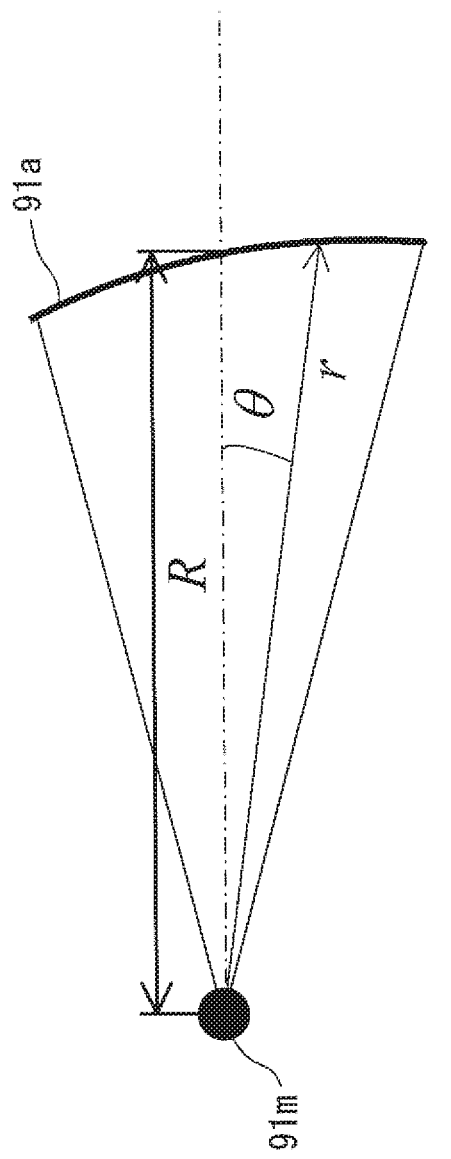
F I G. 12

MICROSCOPE DEVICE, MICROSCOPE SYSTEM, AND ILLUMINATION DEVICE

CROSS REFERENCE TO RELATED APPLICATIONS

This application is based upon and claims the benefit of priority from the prior Japanese Patent Application No. 2017-026475, filed on Feb. 15, 2017, the entire contents of which are incorporated herein by this reference.

BACKGROUND OF THE INVENTION

Field of the Invention

The present invention relates to a microscope device, a microscope system, and an illumination device.

Description of the Related Art

As a technology for acquiring a three-dimensional image of a biological specimen, selective plane illumination microscopy (SPIM) for selectively illuminating a cross section of a biological specimen that crosses an optical axis of an observation optical system (hereinafter referred to as an observation optical axis) is known. SPIM has an advantage wherein damage to a biological specimen can be reduced, an advantage wherein a high resolving power in a direction of the observation optical axis can be achieved, an advantage wherein the depth of a biological specimen can be observed, and other advantages. In recent years, SPIM has been attracting attention. A microscope using SPIM (hereinafter referred to as an SPIM microscope) is described, for example, in Japanese Laid-Open Patent Publication No. 2012-108491 and Chinese Laid-Open Patent Publication No. 104407436.

In general, in the SPIM microscope, as the numerical aperture of an illumination optical system increases, a higher resolving power in the direction of the observation optical axis can be achieved. However, as described in Japanese Laid-Open Patent Publication No. 2012-108491, as the numerical aperture of the illumination optical system increases, an area in which illumination light having a sufficient intensity is applied and a fluorescent material is excited (hereinafter referred to as an illumination area) is reduced in a direction of the optical axis of the illumination optical system (hereinafter referred to as an illumination optical axis).

A technology relating to the technical problem above is described in Chinese Laid-Open Patent Publication No. 104407436. Chinese Laid-Open Patent Publication No. 104407436 describes a technology for moving a condensing position of illumination light in a direction parallel to the illumination optical axis (hereinafter referred to as an illumination optical axis direction) at a high speed such that the illumination area is expanded in the illumination optical axis direction.

SUMMARY OF THE INVENTION

A microscope device in one aspect of the present invention includes: an illumination optical system that has an illumination optical axis and that irradiates an observation object with illumination light; and an observation optical system that has an observation optical axis that has a direction different from the illumination optical axis and that projects an image of the observation object onto an imaging device. The illumination optical system includes a first scanning device that moves a condensing position in which the illumination light emitted from the illumination optical system is condensed in a direction that is substantially parallel to the illumination optical axis. The first scanning device includes: a rotary mirror that includes a reflection surface; and a condenser lens that is arranged so as to irradiate the reflection surface with the illumination light and to receive the illumination light reflected by the reflection surface, and the first scanning device rotationally moves or rotates the rotary mirror in such a way that a distance between the condenser lens and the reflection surface on an optical axis of the condenser lens changes.

A microscope system in one aspect of the present invention includes: the microscope device according to the aspect above; and a computing device that generates image data of a three-dimensional image of the observation object in accordance with an image signal output from the imaging device. The microscope device further includes the imaging device that images the observation object and that outputs the image signal.

An illumination device in one aspect of the present invention is an illumination device including an illumination optical system that irradiates an observation object with illumination light. The illumination optical system includes a first scanning device that moves a condensing position in which the illumination light emitted from the illumination optical system is condensed in a direction that is substantially parallel to an illumination optical axis of the illumination optical system. The first scanning device includes: a rotary mirror that includes a reflection surface; and a condenser lens that is arranged so as to irradiate the reflection surface with the illumination light and to receive the illumination light reflected by the reflection surface, and the first scanning device rotationally moves or rotates the rotary mirror in such a way that a distance between the condenser lens and the reflection surface on an optical axis of the condenser lens changes.

BRIEF DESCRIPTION OF THE DRAWINGS

The present invention will be more apparent from the following detailed description when the accompanying drawings are referenced.

FIG. 4 illustrates the configuration of a scanning device 36.

FIG. 7 is a flowchart illustrating a flow of two-dimensional image acquisition processing illustrated in FIG. 6.

FIG. 9 is a diagram explaining the shape of a reflection surface 81a.

FIG. 12 is a diagram explaining the shape of a reflection surface 91a.

DESCRIPTION OF THE EMBODIMENTS

Chinese Laid-Open Patent Publication No. 104407436 describes a tunable acoustic gradient index lens (hereinafter referred to as a TAG lens), an electric control zoom lens, and a micro-mechanism variable reflector mirror (hereinafter referred to as a MEMS mirror) as a configuration that moves a condensing position of illumination light in an illumination optical axis direction at a high speed.

However, when the TAG lens is used, the speed of the movement of the condensing position (hereinafter referred to as a scanning speed) changes in a sinusoidal shape, and therefore an illumination area is not illuminated uniformly. When the electric control zoom lens is used, a lens physically moves, and therefore a sufficient scanning speed may fail to be achieved. When the MEMS mirror is used, a device becomes expensive. Thus, a new technology for moving the condensing position of illumination light in the illumination optical axis direction at a high speed is requested.

Embodiments of the present invention are described below.

First Embodiment

Figure 1:
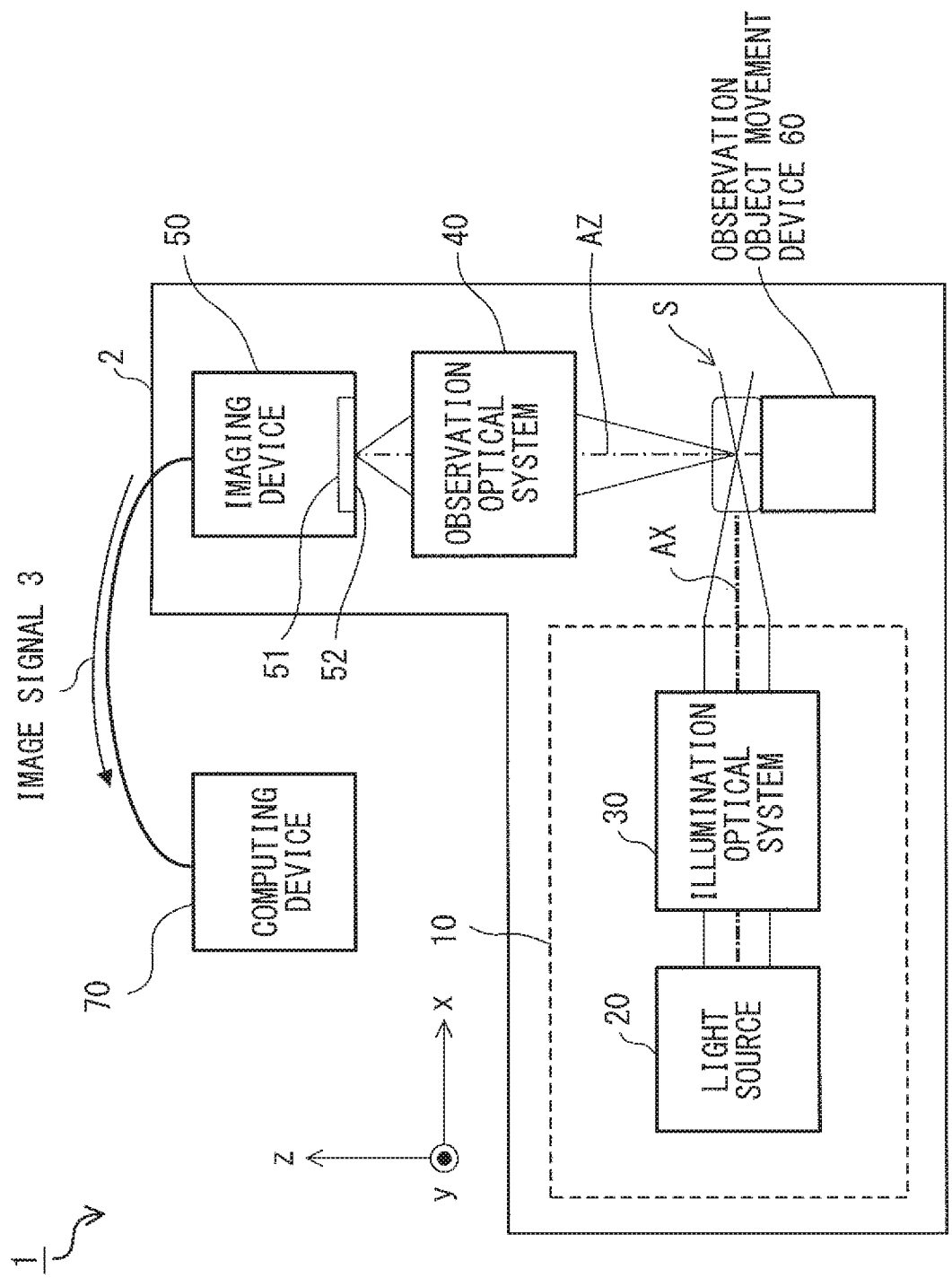
FIG. 1 illustrates the configuration of a microscope system 1.
Figure 2:
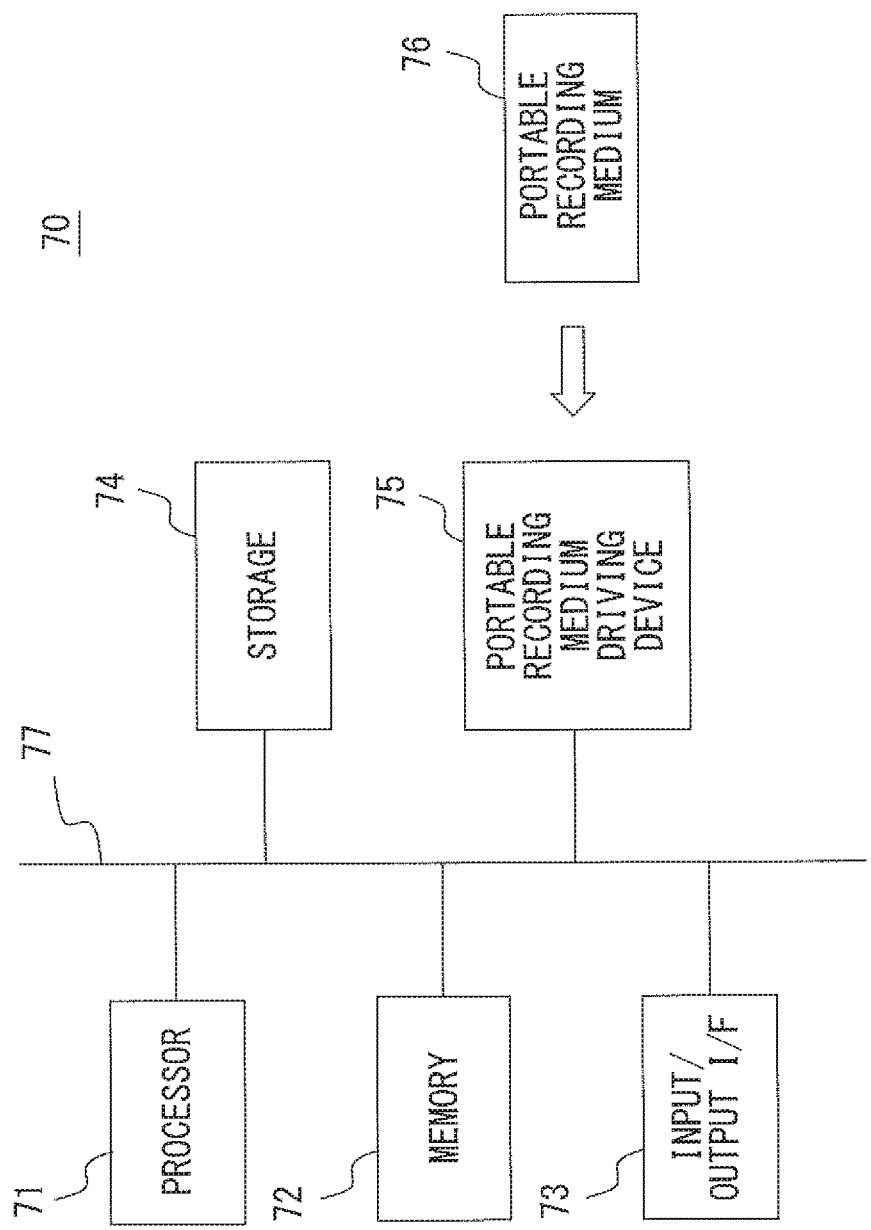
FIG. 2 illustrates the configuration of the hardware of a computing device 70.

FIG. 1 illustrates the configuration of a microscope system 1 according to this embodiment. FIG. 2 illustrates the configuration of the hardware of a computing device 70. The microscope system 1 illustrated in FIG. 1 includes a microscope device 2 that acquires an image of an observation object S, and a computing device 70. The xyz coordinate system illustrated in FIG. 1 is an orthogonal coordinate system that is defined for convenience of direction reference in the specification. An x-axis direction is an illumination optical axis direction, a z-axis direction is an observation optical axis direction, and a y-axis direction is a direction that is orthogonal to both the illumination optical axis direction and the observation optical axis direction.

The microscope device 2 is an SPIM microscope using selective plane illumination microscopy (also referred to as a light-sheet microscope), and the microscope device 2 is, for example, a single-photon excitation microscope or a multi-photon excitation microscope. The microscope device 2 includes an illumination device 10, an observation optical system 40, an imaging device 50, and an observation object movement device 60.

The illumination device 10 is a device that illuminates a cross section of the observation object S that crosses an observation optical axis AZ, which is the optical axis of the observation optical system 40. The illumination device 10 includes a light source 20 that emits illumination light, and an illumination optical system 30 that irradiates the observation object S with the illumination light.

The light source 20 is, for example, an ultra-short pulse laser source that emits a laser beam in an infrared wavelength region, a laser source that emits a laser beam in an ultraviolet wavelength region or a visible wavelength region, or the like. The illumination optical system 30 has an illumination optical axis AX, which is the optical axis of the illumination optical system 30, and the illumination optical system 30 is configured to condense illumination light at a single point so as to form an optical spot. The illumination optical system 30 includes a scanning device (hereinafter referred to as a first scanning device) that moves a condensing position (hereinafter referred to as a first condensing position) in which the illumination light emitted from the illumination optical system 30 is condensed in a direction that is substantially parallel to the illumination optical axis AX (namely, a direction that is substantially parallel to the x-axis direction), and a scanning device (hereinafter referred to as a second scanning device) that moves the first condensing position in the y-axis direction, which is orthogonal to both the illumination optical axis AX and the observation optical axis AZ. In the illumination device 10, the first scanning device and the second scanning device move the first condensing position such that an optical cross section formed within the observation object S is illuminated.

The observation optical system 40 has an observation optical axis AZ for which a direction is different from that of the illumination optical axis AX, and more specifically, an observation optical axis AZ that is orthogonal to the illumination optical axis AX. The observation optical system 40 projects an image of the observation object S onto the imaging device 50. The illumination optical system 30 and the observation optical system 40 are arranged such that a front-side focal plane of the observation optical system 40 is located on or near the illumination optical axis AX of the illumination optical system 30. In other words, the illumination optical system 30 and the observation optical system 40 are arranged such that a focus of the observation optical system 40 is located on or near an optical cross section formed by the illumination optical system 30. Both a position near the illumination optical axis AX and a position near the optical cross section are within a range of a depth of focus of the observation optical system 40.

The imaging device 50 is a digital camera including an image sensor 51. The imaging device 50 is, for example, a charge-coupled device (CCD) camera or a complementary metal oxide semiconductor (CMOS) camera, and the imaging device 50 images the observation object S. More specifically, the imaging device 50 integrates light from the optical cross section that enters during an exposure period, detects the light, and outputs, to the computing device 70, a digital image signal (an image signal 3) of a two-dimensional image of the observation object S. The imaging device 50 is arranged in such a way that a projected image of an imaging plane 52 that is formed on the observation object S by the observation optical system 40 (a plane that is optically conjugate to the imaging plane 52) is parallel to the illumination optical axis AX. Stated another way, considering that the illumination optical axis AX and the observation optical axis AZ are orthogonal to each other, the imaging device 50 is arranged in such a way that the imaging plane 52 is orthogonal to the observation optical axis AZ. By doing this, an image of an optical cross section of the observation object S is projected onto the imaging device 50 by the observation optical system 40.

The observation object movement device 60 is a device that moves the observation object S in a direction that is parallel to the observation optical axis AZ. The observation object movement device 60 is, for example, an electric stage that includes a stage on which the observation object S is placed and a driving device that moves the stage in the observation optical axis direction. The observation object movement device 60 moves the observation object S such that an image of a different area (an optical cross section) within the observation object S can be projected onto the imaging plane 52 without changing a relative position of the illumination optical axis AX with respect to the front-side focal plane of the observation optical system 40.

The computing device 70 is, for example, a standard computer, and the computing device 70 generates image data of a three-dimensional image of the observation object S on the basis of the image signal 3 output from the imaging device 50. The computing device 70 may be a controller that controls the operation of the microscope device 2. The computing device 70 includes a processor 71, a memory 72, an input/output interface 73, storage 74, and a portable recording medium driving device 75 into which a portable recording medium 76 is inserted, as illustrated in FIG. 2, and these components are connected to each other via a bus 77.

The processor 71 includes, for example, a central processing unit (CPU), a micro processing unit (MPU), a digital signal processor (DSP), and the like, and the processor 71 executes a program and performs programmed processing such as processing for generating three-dimensional image data. The memory 72 is, for example, a random access memory (RAM), and the memory 72 transitorily stores a program or data that is recorded in the storage 74 or the portable recording medium 76.

The input/output interface 73 is a circuit that communicates a signal with a device (the microscope device 2) other than the computing device 70. The storage 74 is, for example, a hard disk or a flash memory, and the storage 74 is principally used to record various types of data or programs. The portable recording medium driving device 75 houses the portable recording medium 76 such as an optical disk or a CompactFlash (registered trademark). The portable recording medium 76 has a role of assisting the storage 74. The storage 74 and the portable recording medium 76 are respective examples of a non-transitory computer-readable medium that record a program.

The configuration illustrated in FIG. 2 is an example of a hardware configuration of the computing device 70, and the configuration of the computing device 70 is not limited to the configuration illustrated in FIG. 2. The computing device 70 may be a dedicated device rather than a general-purpose device. The computing device 70 may include an electric circuit, such as an application specific integrated circuit (ASIC) or a field programmable gate array (FPGA), instead of or in addition to a processor that executes a program, and the electric circuit may perform the processing described later.

Figure 3:
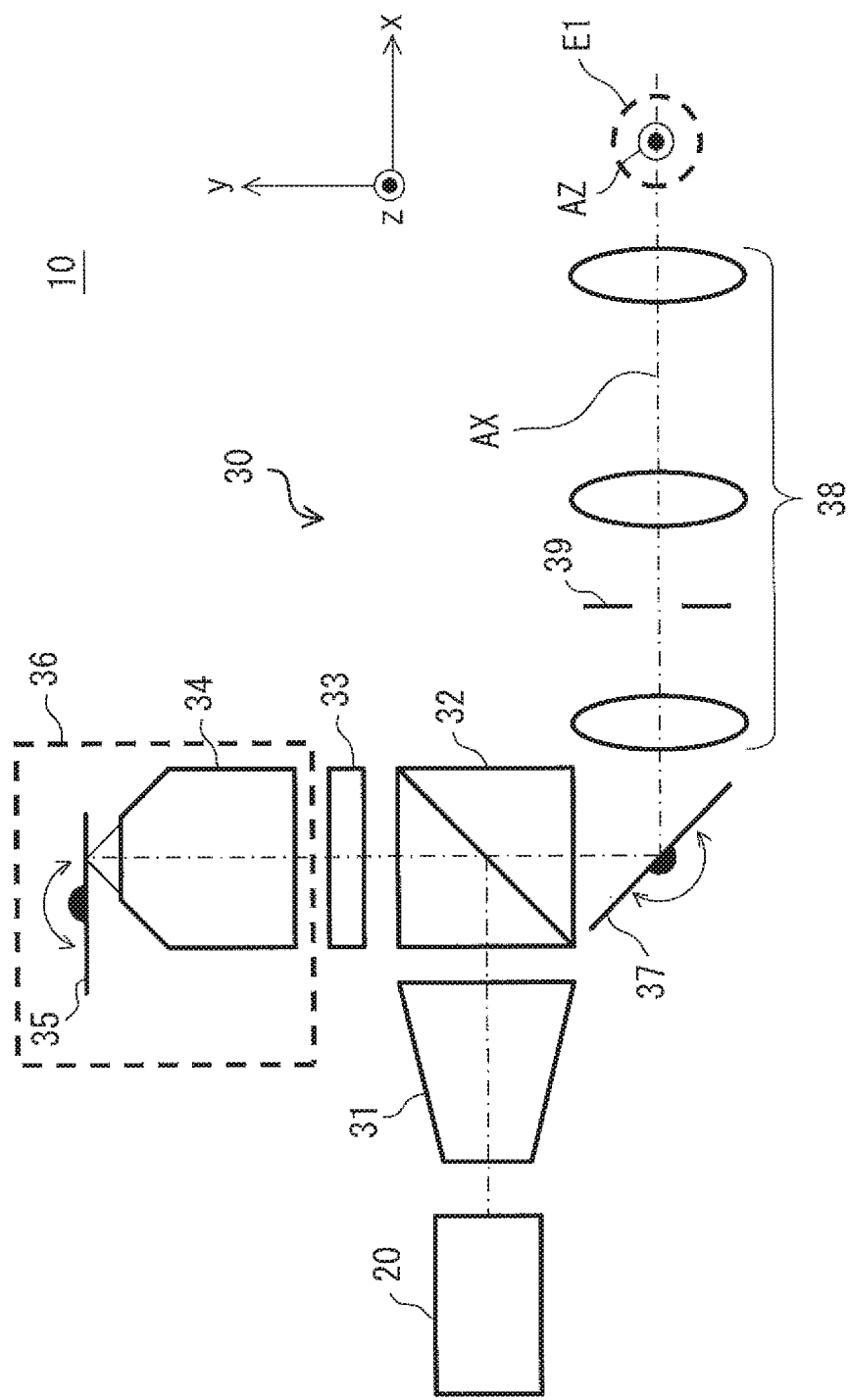
FIG. 3 illustrates the configuration of an illumination device 10.
Figure 5:
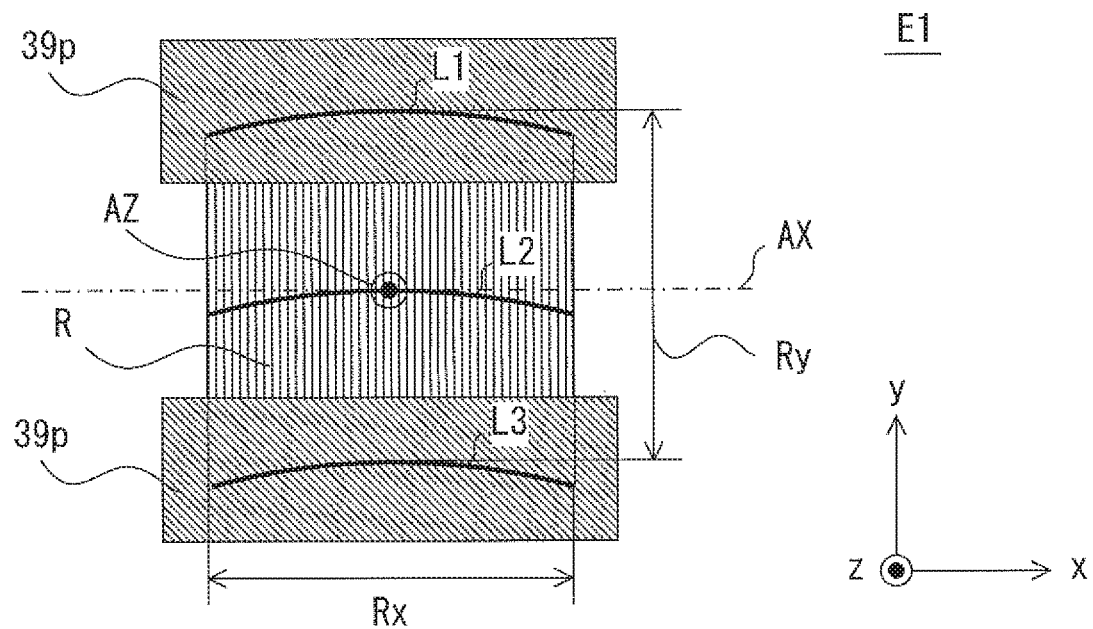
FIG. 5 is an enlarged view of area E1 illustrated in FIG. 3.

FIG. 3 illustrates the configuration of the illumination device 10. FIG. 4 illustrates the configuration of a scanning device 36. FIG. 5 is an enlarged view of area E1 illustrated in FIG. 3. The illumination device 10 includes a light source 20 and an illumination optical system 30 that condenses illumination light at a single point so as to form an optical spot, as illustrated in FIG. 3. The illumination optical system 30 includes a beam expander 31, a polarization beam splitter (PBS) 32, a λ/4 plate 33, a scanning device 36, a scanning device 37, a condenser optical system 38, and an illumination field stop 39.

The scanning device 36 is a first scanning device that moves a first condensing position in a direction that is parallel to the illumination optical axis AX. The scanning device 36 includes a condenser lens 34 and a rotary mirror 35 that includes a reflection surface 35a, as illustrated in FIG. 4. The scanning device 36 rotationally moves the rotary mirror 35 in such a way that a distance between the condenser lens 34 and the reflection surface 35a on an optical axis AC of the condenser lens 34 changes.

The condenser lens 34 is arranged so as to irradiate the reflection surface 35a with illumination light that has been output from the condenser lens 34 and to receive illumination light reflected by the reflection surface 35a. More specifically, the condenser lens 34 is arranged so as to have a focal plane P1 near the rotary mirror 35 and to condense illumination light near the rotary mirror 35, as illustrated in FIG. 4. Stated another way, the condenser lens 34 is arranged in such a way that illumination light that is parallel light that has entered the scanning device 36 is condensed between the condenser lens 34 and the rotary mirror 35. The phrase "illumination light is condensed between the condenser lens 34 and the rotary mirror 35" means that illumination light that has been output from the condenser lens 34 is condensed before the illumination light is reflected by the rotary mirror 35, and that the illumination light that has been output from the condenser lens 34 is condensed after the illumination light is reflected by the rotary mirror 35.

The rotary mirror 35 is a galvanometer mirror, and the direction of a rotation axis 35b included in the rotary mirror 35 corresponds to a direction that is parallel to the observation optical axis AZ, as illustrated in FIG. 3. The phrase "the direction of the rotation axis 35b corresponds to a direction that is parallel to the observation optical axis AZ" means that, when an image of the rotary mirror 35 is projected near the first condensing position, the direction of an image of the rotation axis 35b included in the image of the rotary mirror 35 is a direction that is parallel to the observation optical axis AZ. The rotary mirror 35 is arranged so as to include the rotation axis 35b on the focal plane P1 of the condenser lens 34 and in a position separated from the optical axis AC of the condenser lens 34 by distance d1, as illustrated in FIG. 4.

The scanning device 37 is a second scanning device that moves the first condensing position in a direction (the y-axis direction) that is orthogonal to both the illumination optical axis AX and the observation optical axis AZ. The scanning device 37 is a resonant scanner that rotationally moves at a higher speed than the speed of the rotary mirror 35, which is a galvanometer mirror. The scanning device 37 may be a galvanometer mirror that rotationally moves at a higher speed than the speed of the rotary mirror 35. It is preferable that the scanning device 37 be arranged at or near a pupil position of the condenser optical system 38.

The illumination field stop 39 is a diaphragm that limits an illumination field of the illumination device 10, and the illumination field stop 39 is arranged between the scanning device 37 and the first condensing position. The illumination field stop 39 may at minimum have a structure that limits the illumination field in a direction in which the scanning device 37 moves the first condensing position.

In the illumination device 10, illumination light that has been emitted from the light source 20 as parallel light is a laser beam, and the beam diameter of the illumination light is first adjusted by the beam expander 31. The illumination light is reflected by the PBS 32, and enters the scanning device 36 via the λ/4 plate 33. The illumination light that has entered the scanning device 36 enters the condenser lens 34, and is applied to the reflection surface 35a of the rotary mirror 35. The illumination light that has been reflected by the rotary mirror 35 (the reflection surface 35a) enters the condenser lens 34 again, and enters the PBS 32 via the λ/4 plate 33. The polarization direction of the illumination light that has entered the PBS 32 via the λ/4 plate 33 is different by 90 degrees from the polarization direction of the illumination light that has entered the PBS 32 via the beam expander 31. Therefore, the illumination light that has entered the PBS 32 via the λ/4 plate 33 passes through the PBS 32. The illumination light that has passed through the PBS 32 is deflected by the scanning device 37, enters the condenser optical system 38, and is condensed at a single point (the first condensing position) within the observation object S.

The first condensing position moves in the illumination optical axis direction by the scanning device 36 rotationally moving the rotary mirror 35. This is because, when a distance between the condenser lens 34 and the rotary mirror 35 on the optical axis AC changes due to the rotational movement of the rotary mirror 35, an optical path length after illumination light is output from the condenser lens 34 and is reflected by the rotary mirror 35 and before the illumination light enters the condenser lens 34 again changes. When the optical path length changes, a state of illumination light output from the scanning device 36 changes.

As an example, when an angle Φ of the rotary mirror 35 with respect to the focal plane P1 is 0, the illumination light output from the condenser lens 34 is condensed on the focal plane P1, and is simultaneously reflected by the reflection surface 35a. In this case, illumination light that enters the condenser lens 34 again can be regarded as light that has been generated from the optical spot F1 on the focal plane P1. Therefore, illumination light output from the scanning device 36 is parallel light, and the light spot F1 is projected onto the observation object S by the illumination optical system 30.

When the angle Φ is positive, as illustrated in FIG. 4, illumination light that has been diverged after forming the optical spot F1 on the focal plane P1 is reflected by the reflection surface 35a. In this case, illumination light that enters the condenser lens 34 again can be regarded as light that has been generated from a virtual image F2 of the optical spot F1. Therefore, illumination light output from the scanning device 36 is convergent light, and the virtual image F2 is projected onto the observation object S by the illumination optical system 30.

Similarly, when the angle Φ is negative, illumination light that enters the condenser lens 34 again can be regarded as light that has been generated from the optical spot that is formed between the focal plane P1 and the condenser lens 34 after being reflected by the reflection surface 35a. Therefore, illumination light output from the scanning device 36 is divergent light, and the optical spot formed between the focal plane P1 and the condenser lens 34 is projected onto the observation object S by the illumination optical system 30.

Accordingly, in the illumination device 10, the scanning device 36 rotationally moves the rotary mirror 35 and changes a state of illumination light output from the scanning device 36 such that an optical spot that is a projection source can be moved in the optical axis direction. By doing this, the first condensing position can be moved in the illumination optical axis direction. The rotary mirror 35, which is a galvanometer mirror, can perform triangular driving (a constant-speed rotational movement) at a frequency of about 1 kHz. Therefore, the scanning device 36 can move the first condensing position at a constant speed, although the first condensing position cannot be moved at a constant speed in a case in which the first condensing position is moved using a TAG lens. Further, the scanning device 36 can move the first condensing position in the illumination optical axis direction at a speed higher than that of an electric control zoom lens, which also can move the first condensing position at a constant speed.

In addition, the first condensing position moves in a direction that is orthogonal to both the illumination optical axis direction and the observation optical axis direction by rotationally moving a mirror of the scanning device 37. This is because an angle of illumination light that enters the pupil position of the condenser optical system 38 changes due to the rotational movement of the mirror. The scanning device 37, which is a resonant scanner, can be sinusoidal driven at a sufficiently higher-speed frequency (for example, 16 kHz) than that of the galvanometer mirror.

Accordingly, by employing the illumination device 10, the first condensing position can be moved two-dimensionally at a high speed by using the scanning device 36 and the scanning device 37, and a two-dimensional area (an illumination area) that is orthogonal to the observation optical axis AZ can be illuminated in a short time. Therefore, the microscope device 2 including the illumination device 10 and the microscope system 1 enable a two-dimensional image to be acquired in a short time.

In addition, in the illumination device 10, a locus L0 of the optical spot serving as a projection source that is formed due to the rotational movement of the rotary mirror 35 indicates an arc having radius (distance) d1 with the rotation axis 35b as a center so as to be substantially parallel to the optical axis AC, as illustrated in FIG. 4. Accordingly, as illustrated in FIG. 5, a locus (for example, a locus L1, L2, or L3) of the first condensing position that is formed on the observation object S due to the rotational movement of the rotary mirror 35 also has an arc shape that is substantially parallel to the optical axis AX. The scanning range Rx illustrated in FIG. 5 is a movement range of the first condensing position moved by the scanning device 36. Therefore, even when the scanning device 36 rotationally moves the rotary mirror 35 at a constant speed by triangular driving (namely, at an equal angular velocity), the speed of the movement in the illumination optical axis direction of the first condensing position is not strictly constant. However, considering that an angular range of the rotational movement of the rotary mirror 35 is not wide, the speed of the movement in the illumination optical axis direction of the first condensing position can be regarded approximately as a constant speed, and a change in speed can be sufficiently reduced in comparison with a case in which a TAG lens for which the speed changes in a sinusoidal shape is used.

Accordingly, by employing the illumination device 10, the first condensing position can be moved in the illumination optical axis direction in a state in which a change in speed is sufficiently reduced, and consequently, an integrated intensity distribution of illumination light that is applied to the illumination area has a high uniformity in the illumination optical axis direction. Therefore, by employing the microscope device 2 and the microscope system 1, an image in which variations in brightness in the illumination optical axis direction are reduced can be acquired.

In addition, in the illumination device 10, a resonant scanner is used as the scanning device 37 in order to increase the speed of the movement in the y-axis direction of the first condensing position. Therefore, the speed of the movement in the y-axis direction of the first condensing position is not constant and is low near both ends of the movement range (the scanning range Ry illustrated in FIG. 5). However, by limiting the illumination area R using the illumination field stop 39, illumination light can only be applied to an area in which the speed of the movement in the y-axis direction of the first condensing position is considered to be constant. The scanning range Ry illustrated in FIG. 5 is a movement range of the first condensing position that is moved by the scanning device 37 in a case in which the illumination field stop 39 is not provided. The image 39p illustrated in FIG. 5 is an image of the illumination field stop 39 that is projected onto the observation object S.

Accordingly, by employing the illumination device 10, the first condensing position can be moved two-dimensionally while sufficiently reducing a change in speed, and consequently, an integrated intensity distribution of illumination light applied to the illumination area R has a high uniformity regardless of a direction. Therefore, by employing the microscope device 2 and the microscope system 1, an image in which variations in brightness are reduced can be acquired.

In addition, in the illumination device 10, the rotary mirror 35 is provided in such a way that the direction of the rotation axis 35b corresponds to a direction that is parallel to the observation optical axis AZ. In this configuration, even when the rotary mirror 35 moves rotationally, the normal direction of the reflection surface 35a is maintained to be substantially orthogonal to the observation optical axis AZ.

Accordingly, by employing the illumination device 10, the first condensing position can be moved in the illumination optical axis direction without any movement in the observation optical axis direction. Therefore, an optical cross section that is orthogonal to the observation optical axis direction can be illuminated.

Figure 6:
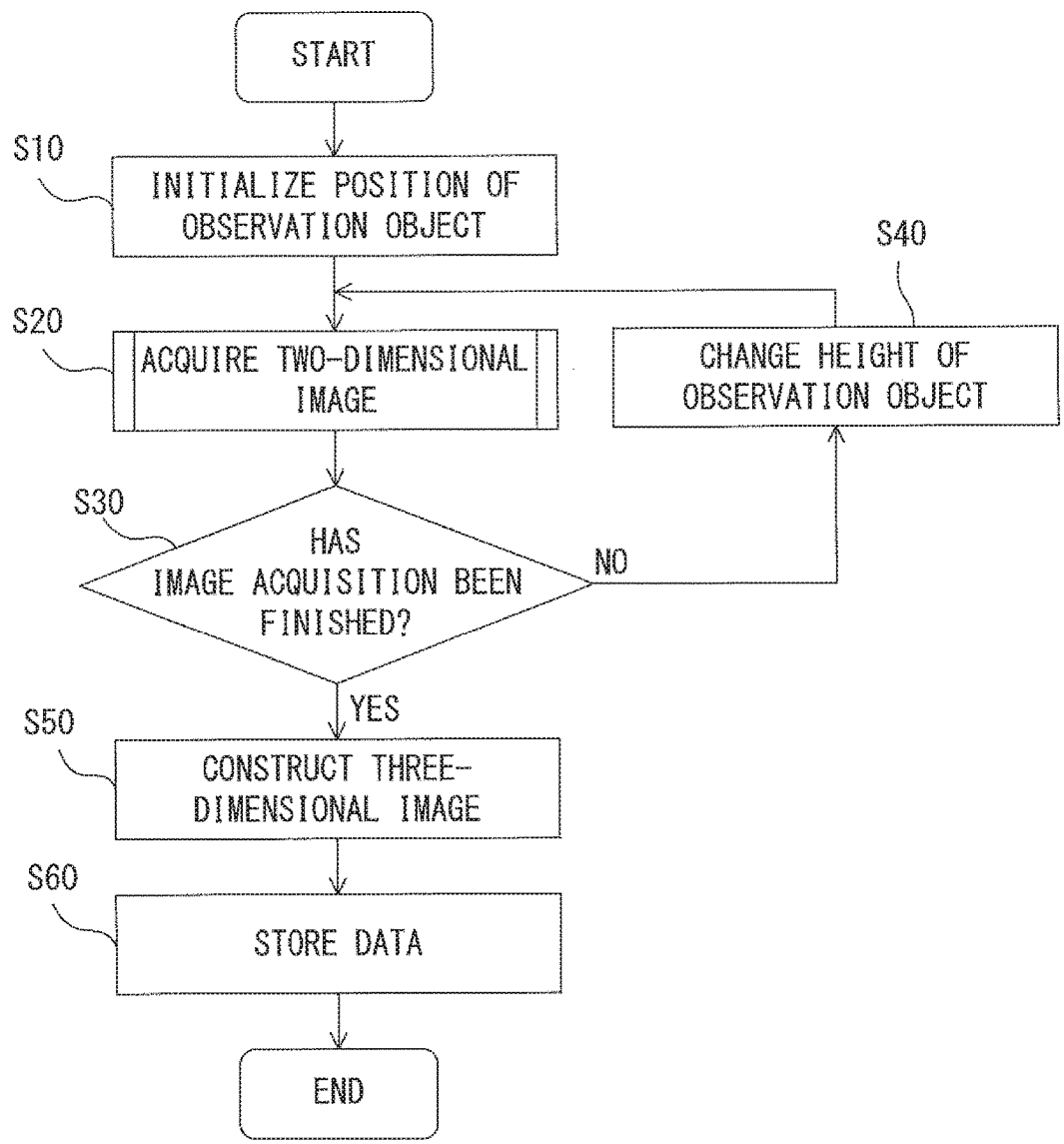
FIG. 6 is a flowchart illustrating a flow of processing performed by the microscope system 1.

FIG. 6 is a flowchart illustrating a flow of processing performed by the microscope system 1. FIG. 7 is a flowchart illustrating a flow of two-dimensional image acquisition processing illustrated in FIG. 6. Processing performed by the microscope system 1 is described below in detail with reference to FIG. 6 and FIG. 7.

The microscope system 1 first initializes the position of the observation object S (step S10). Here, the observation object movement device 60 moves the observation object S to a reference position. The microscope system 1 moves the observation object S to respective positions within a prescribed height range of the height of the observation object S, and repeats the acquisition of a two-dimensional image of the observation object S (step S20 to step S40).

In the two-dimensional image acquisition processing of step S20, the movement of the first condensing position is started (step S21), irradiation of the observation object S with illumination light (a laser beam) is started (step S22), and the observation object S is imaged (step S23). Here, as an example, the computing device 70 causes the scanning device 36 and the scanning device 37 to start the movement of the first condensing position, and causes the light source 20 to start emission of illumination light. In synchronization with these processes, the imaging device 50 starts exposure control, and outputs, to the computing device 70, an image signal that has been generated from light that has been integrated during an exposure period and has been detected. When the exposure period has passed, the microscope system 1 terminates irradiation with the illumination light (step S24), terminates the movement of the first condensing position (step S25), and terminates the two-dimensional image acquisition processing.

When the two-dimensional image acquisition processing is terminated, the microscope system 1 determines whether all of the scheduled two-dimensional images have been acquired (step S30). When not all of the scheduled two-dimensional images have been acquired, the observation object movement device 60 changes the height of the observation object S by a prescribed distance (step S40). Namely, the observation object movement device 60 moves the observation object S in the observation optical axis direction. The microscope system 1 acquires a two-dimensional image again (step S20).

When all of the scheduled two-dimensional images have been acquired, the microscope system 1 constructs a three-dimensional image (step S50). Here, the computing device 70 generates image data of a three-dimensional image on the basis of a plurality of two-dimensional images output from the imaging device 50. The microscope system 1 stores the image data of the three-dimensional image constructed in step S50 in the computing device 70 (step S60), and terminates a series of processes.

In the microscope system 1 according to this embodiment, by moving the first condensing position in a direction that is orthogonal to the observation optical axis AZ at a high speed, a cross section orthogonal to the observation optical axis AZ can be scanned in a short time. In addition, a cross section can be scanned with a uniform illumination intensity regardless of a scanning position. Accordingly, by employing the microscope system 1, an image can be acquired using uniform illumination in a short time. An illumination time is reduced, and therefore damage to the observation object S can be reduced. Accordingly, the progress of bleaching of a fluorescent material within the observation object S can be delayed, and an influence of phototoxicity can be reduced.

Second Embodiment

Figure 8:
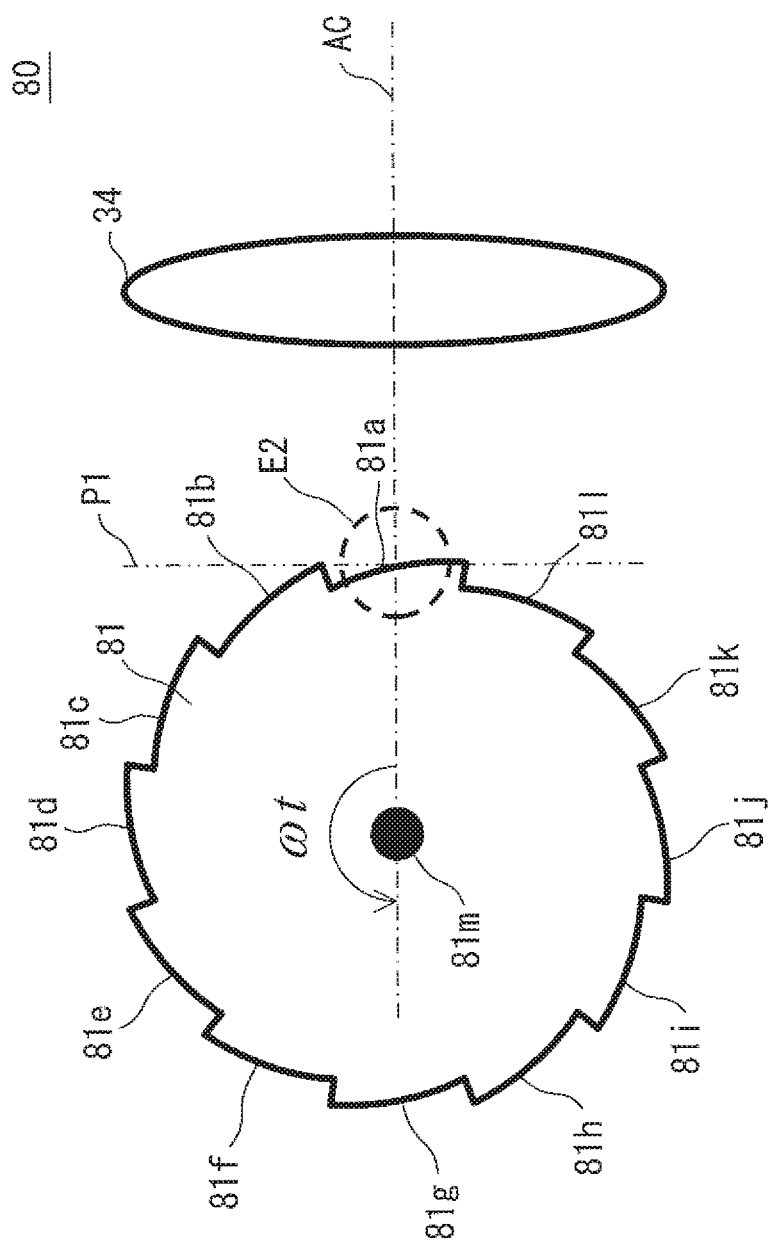
FIG. 8 illustrates the configuration of a scanning device 80.
Figure 9:
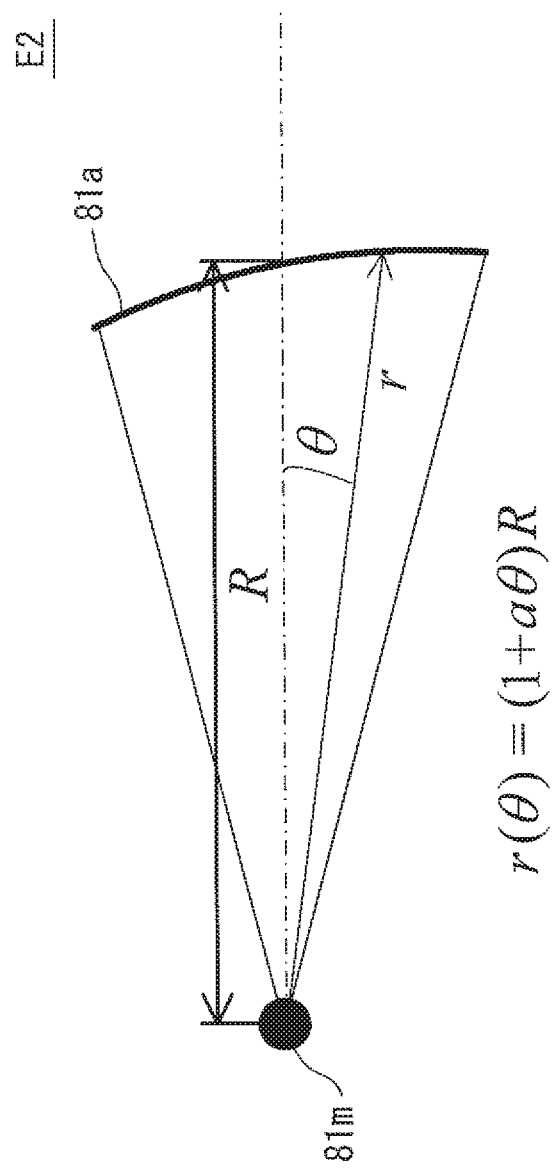
Figure 10:
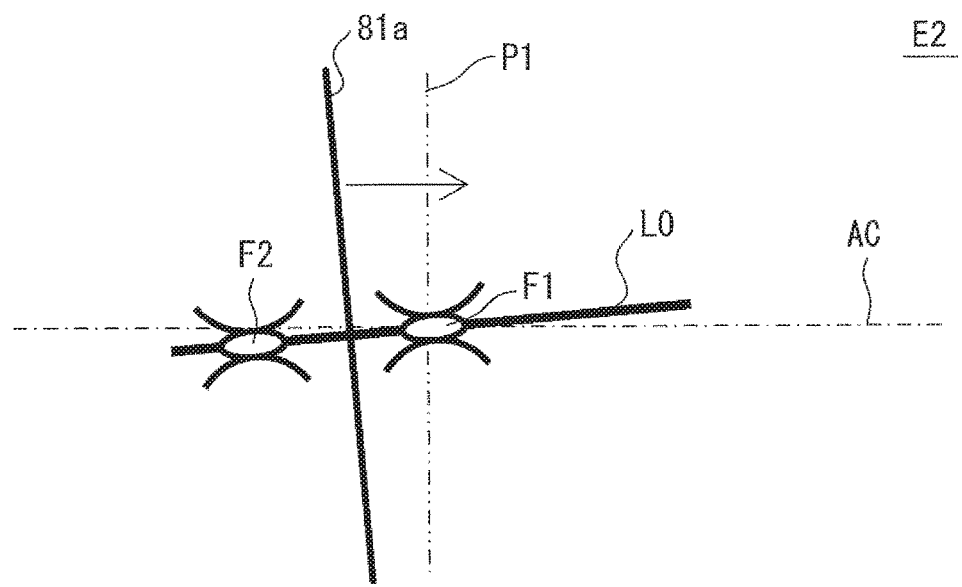
FIG. 10 is an enlarged view of area E2 illustrated in FIG. 8.

FIG. 8 illustrates the configuration of a scanning device 80. FIG. 9 is a diagram explaining the shape of a reflection surface 81a. FIG. 10 is an enlarged view of area E2 illustrated in FIG. 8. A microscope system according to this embodiment is different from the microscope system 1 according to the first embodiment in that the scanning device 80 is included instead of the scanning device 36. The scanning device 80 is described below.

The scanning device 80 is a first scanning device that moves the first condensing position in a direction parallel to the illumination optical axis AX. The scanning device 80 includes a condenser lens 34 and a rotary mirror 81 including a plurality of reflection surfaces (reflection surfaces 81a to 81l), as illustrated in FIG. 8. The scanning device 80 rotates the rotary mirror 81 in a single direction in such a way that a distance between the condenser lens 34 and a reflection surface of the rotary mirror 81 on an optical axis AC of the condenser lens 34 changes.

The rotary mirror 81 includes a rotation axis 81m on the optical axis AC of the condenser lens 34, as illustrated in FIG. 8, and the rotary mirror 81 is arranged in such a way that the reflection surface 81a on the optical axis AC forms a minute angle with respect to a focal plane P1. The direction of the rotation axis 81m corresponds to a direction that is parallel to the observation optical axis AZ. The rotary mirror 81 includes a plurality of sectors that are equally divided in a circumferential direction, and the rotary mirror 81 includes a reflection surface in each of the sectors. Stated another way, the plurality of reflection surfaces are aligned in the circumferential direction. A normal direction of each of the reflection surfaces is orthogonal to the rotation axis 81m.

Assume that a direction between a position on a reflection surface that forms an angle θ with respect to the center line of a sector that passes through the rotation axis 81*m* and the rotation axis 81*m* is r(θ), as illustrated in FIG. 9. The shape of each of the plurality of reflection surfaces has a relationship whereby r(θ)=(1+aθ)R. In this relational expression, a is a prescribed real number, and R is a distance between a position on a reflection surface that passes through the center line of a sector and the rotation axis 81*m*.

In the scanning device 80, by rotating the rotary mirror 81 at a constant speed, the reflection surface moves on the optical axis AC at a constant speed in each of the sector sections in a state in which a prescribed minute angle is maintained with respect to the optical axis AC. Therefore, the locus L0 of an optical spot serving as a projection source that is formed due to the rotation of the rotary mirror 81 indicates a straight line forming the prescribed minute angle with respect to the optical axis AC, as illustrated in FIG. 10, and the locus of the first condensing position that is formed on the observation object S also indicates a straight line. Thus, the scanning device 80 can move the first condensing position in the illumination optical axis direction at a constant speed by rotating the rotary mirror 81 at a constant speed.

In addition, in the scanning device 80, the rotary mirror 81 can rotate at a further higher speed than the speed of a galvanometer mirror, for example at 60,000 RPM. Therefore, a rotary mirror 81 including 10 or more sectors enables a high-speed movement at a frequency of 10 kHz or more.

Accordingly, an illumination device according to this embodiment that includes the scanning device 80 can move the first condensing position in the illumination optical axis direction at a further higher speed than that of the illumination device 10. In addition, the first condensing position can be moved in the illumination optical axis direction at a constant speed, and therefore an integrated intensity distribution of illumination light applied to an illumination area has a higher uniformity in the illumination optical axis direction than the uniformity of the illumination device 10. Accordingly, by employing the microscope system according to this embodiment, an image in which variations in brightness in the illumination optical axis direction are reduced can be acquired in a shorter time.

Third Embodiment

Figure 11:
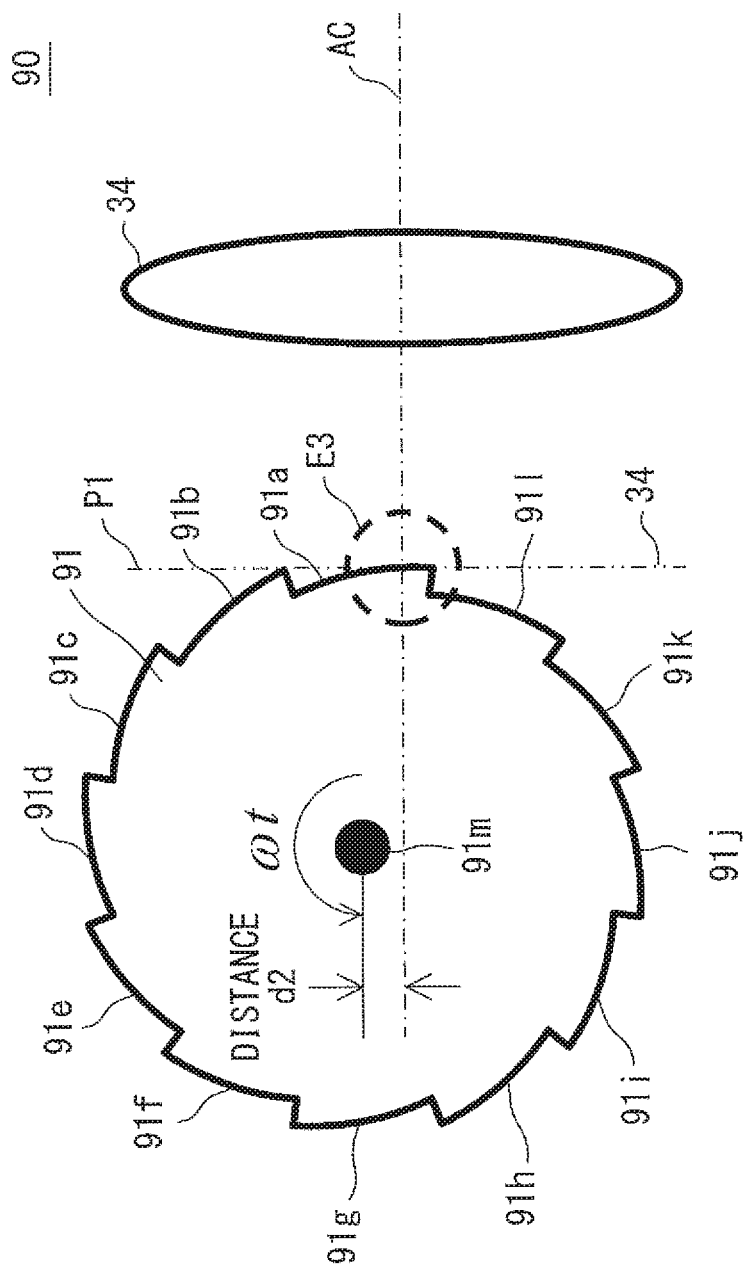
FIG. 11 illustrates the configuration of a scanning device 90.
Figure 13:
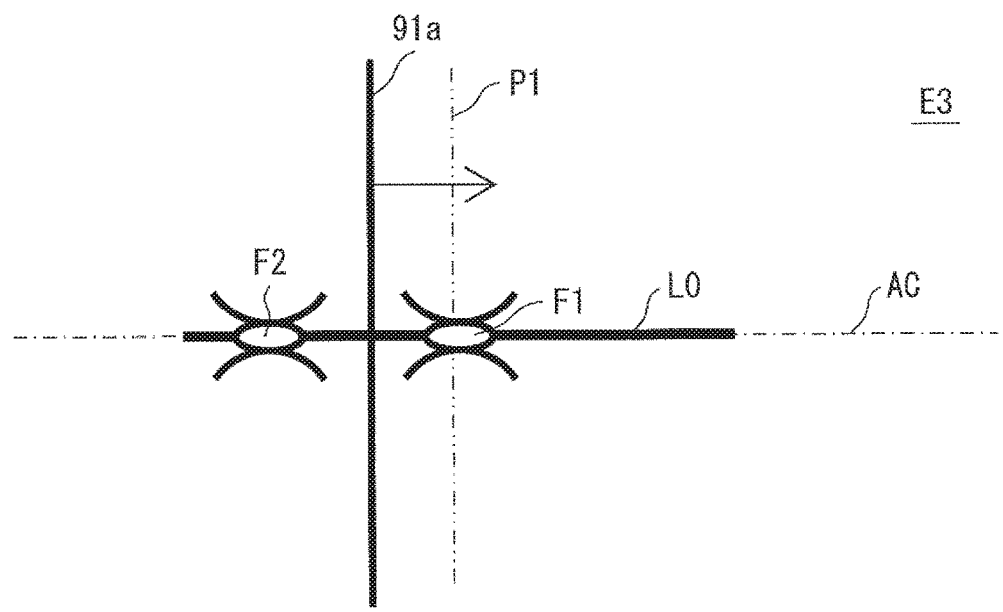
FIG. 13 is an enlarged view of area E3 illustrated in FIG. 11.

FIG. 11 illustrates the configuration of a scanning device 90. FIG. 12 is a diagram explaining the shape of a reflection surface 91*a*. FIG. 13 is an enlarged view of area E3 illustrated in FIG. 11. A microscope system according to this embodiment is different from the microscope system 1 according to the second embodiment in that the scanning device 90 is included instead of the scanning device 80. The scanning device 90 is described below.

The scanning device 90 is a first scanning device that moves the first condensing position in a direction that is parallel to the illumination optical axis AX. The scanning device 90 includes a condenser lens 34 and a rotary mirror 91 that includes a plurality of reflection surfaces (reflection surfaces 91*a* to 91*l*), as illustrated in FIG. 11. The scanning device 90 is similar to the scanning device 80 in that the rotary mirror 91 is rotated in such a way that a distance between the condenser lens 34 and the reflection surface of the rotary mirror 91 on the optical axis AC of the condenser lens 34 changes.

The rotary mirror 91 is arranged in such a way that the rotary mirror 91 includes a rotation axis 91*m* in a position that is separated by distance d2 from the optical axis AC of the condenser lens 34 and the reflection surface 91*a* is substantially parallel to a focal plane P1, as illustrated in FIG. 11. The direction of the rotation axis 91*m* corresponds to a direction that is parallel to the observation optical axis AZ. The rotary mirror 91 includes a plurality of sectors that are equally divided in the circumferential direction, and the rotary mirror 91 includes a reflection surface in each of the sectors. Stated another way, the plurality of reflection surfaces are aligned in the circumferential direction. A normal direction of each of the reflection surfaces is orthogonal to the rotation axis 91*m*.

Assume that a distance between a position on a reflection surface that forms an angle θ with respect to the center line of a sector that passes through the rotation axis 91*m* and the rotation axis 91*m* is r (θ), as illustrated in FIG. 12. The shape of each of the plurality of reflection surfaces has a relationship whereby r(θ)=R·exp(θ·d2/R). In this relational expression, R is a distance between a position on a reflection surface that passes through the center line of a sector and the rotation axis 91*m*.

In the scanning device 90, by rotating the rotary mirror 91 at a constant speed, the reflection surface moves on the optical axis AC at a constant speed in each of the sector sections in a state in which the reflection surface is maintained to be substantially parallel to the focal plane P1. Therefore, the locus L0 of an optical spot serving as a projection source that is formed due to the rotation of the rotary mirror 91 indicates a straight line that is substantially parallel to the optical axis AC, as illustrated in FIG. 13. In addition, the locus of the first condensing position that is formed on the observation object S also indicates a straight line that is substantially parallel to the illumination optical axis AX. Therefore, the scanning device 90 can move the first condensing position in the illumination optical axis direction at a constant speed by rotating the rotary mirror 91 at a constant speed.

In the scanning device 90, the rotary mirror 91 can be rotated at a high speed similarly to the rotary mirror 81 in the scanning device 80 according to the second embodiment. Accordingly, an illumination device according to this embodiment that includes the scanning device 90 can move the first condensing position in the illumination optical axis direction at a further higher speed than the speed of the illumination device 10. In addition, the first condensing position can be moved in the illumination optical axis direction at a constant speed, and therefore an integrated intensity distribution of illumination light applied to an illumination area has a higher uniformity in the illumination optical axis direction than the uniformity of the illumination device 10. Further, the focus of the first condensing position is moved by the scanning device 90 so as to be substantially parallel to the illumination optical axis AX, and therefore the illumination range does not shift in the y-axis direction even when the first condensing position is moved by a long distance in the illumination optical axis direction. By doing this, an amount of illumination light to be shielded by the illumination field stop 39 can be reduced in comparison with the second embodiment such that a high illumination efficiency can be achieved. Accordingly, by employing the microscope system according to this embodiment, an image in which variations in brightness in the illumination optical axis direction are further reduced can be acquired more efficiently in a shorter time.

Fourth Embodiment

Figure 14:
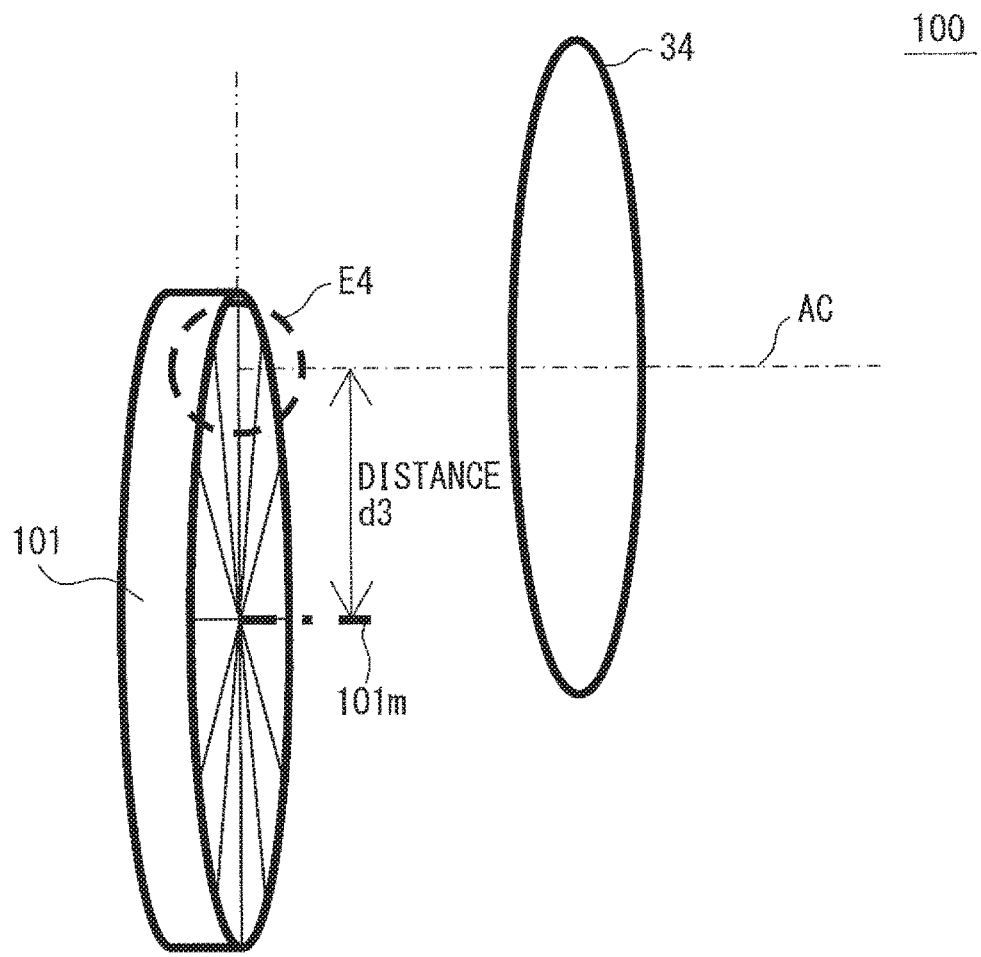
FIG. 14 illustrates the configuration of a scanning device 100.
Figure 15:
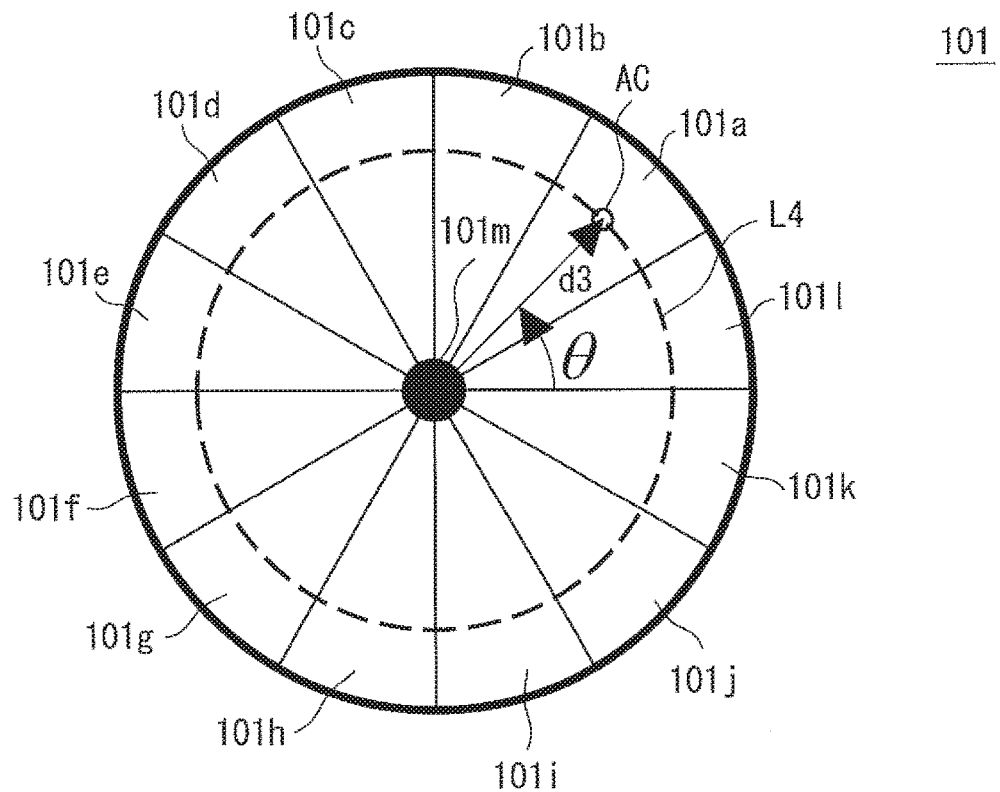
FIG. 15 illustrates the configuration of a rotary mirror 101 when viewed from an axis direction.
Figure 16:
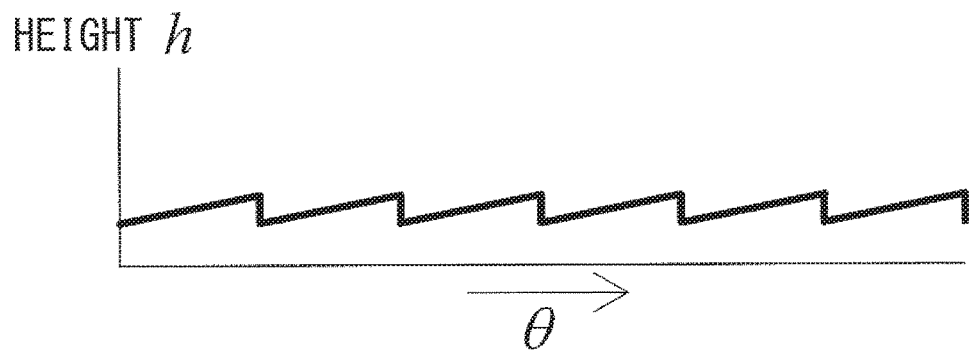
FIG. 16 illustrates a change in height of a reflection surface that is located on an optical axis AC.
Figure 17:
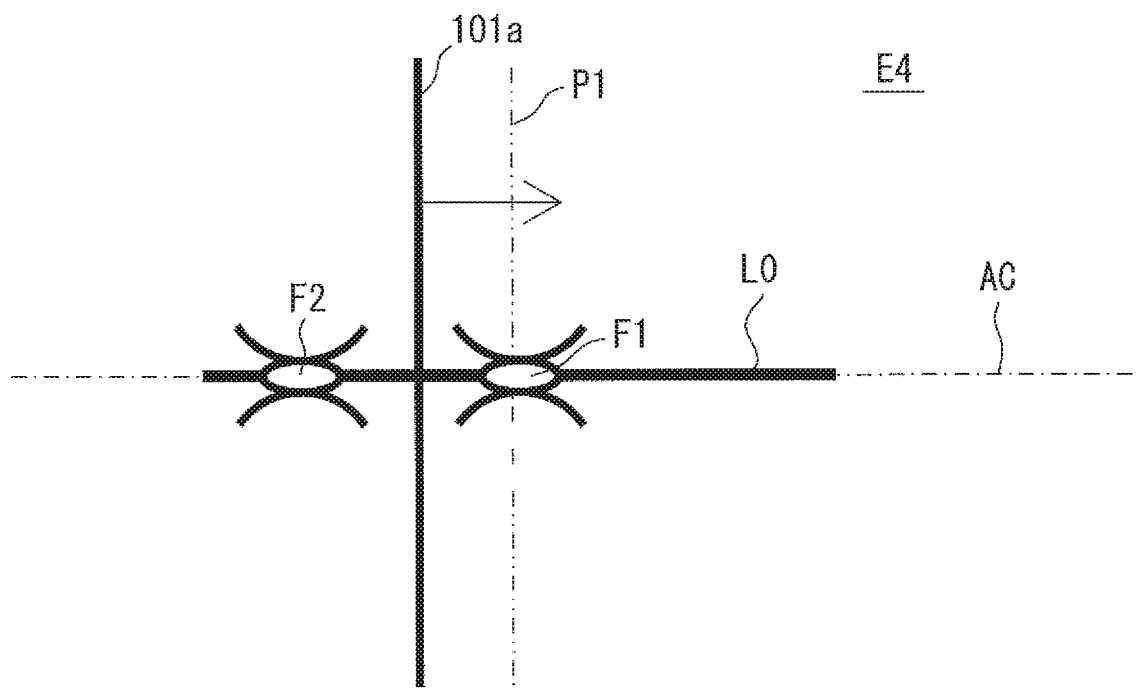
FIG. 17 is an enlarged view of area E4 illustrated in FIG. 14.

FIG. 14 illustrates the configuration of a scanning device 100. FIG. 15 illustrates the configuration of a rotary mirror 101 when viewed from an axis direction. FIG. 16 illustrates a change in height of a reflection surface that is located on the optical axis AC. FIG. 17 is an enlarged view of area E4 illustrated in FIG. 14. A microscope system according to this embodiment is different from the microscope system 1 according to the second embodiment in that the scanning device 100 is included instead of the scanning device 80. The scanning device 100 is described below.

The scanning device 100 is a first scanning device that moves the first condensing position in a direction that is parallel to the illumination optical axis AX. The scanning device 100 includes a condenser lens 34 and a rotary mirror 101 including a plurality of reflection surfaces (reflection surfaces 101a to 101l), as illustrated in FIG. 14 and FIG. 15. The scanning device 100 is similar to the scanning device 80 in that the rotary mirror 101 is rotated in such a way that a distance between the condenser lens 34 and the reflection surface of the rotary mirror 101 on the optical axis AC of the condenser lens 34 changes.

The rotary mirror 101 is arranged so as to include a rotation axis 101m that is substantially parallel to the optical axis AC in a position that deviates from the optical axis AC of the condenser lens 34 (a position that is separated by distance d3), as illustrated in FIG. 14. The rotary mirror 101 has a disk shape, and has a plurality of reflection surfaces (reflection surfaces 101a to 101l) that each have a fan shape and that are aligned in the circumferential direction, as illustrated in FIG. 15. The reflection surfaces have different heights h along the circumferential direction, as illustrated in FIG. 16. FIG. 16 illustrates a change in height on the locus L4 illustrated in FIG. 15. Stated another way, each of the reflection surfaces is configured in such a way that height h in a direction of a rotation axis changes at a fixed ratio with respect to an amount of the rotation of the rotary mirror 101, and the rotary mirror 101 is configured in such a way that height h changes in a serrated shape due to rotation. In addition, the rotary mirror 101 includes a rotation axis 101m that is slightly inclined with respect to the direction of the optical axis AC in such a way that a normal line of each of the reflection surfaces is parallel to the optical axis AC on the optical axis AC.

In the scanning device 100, by rotating the rotary mirror 101 at a constant speed, the height h of the reflection surface can be changed at a fixed speed in a state in which the normal direction of the reflection surface is maintained so as to be parallel to the optical axis AC. Therefore, the locus L0 of an optical spot serving as a projection source that is formed due to the rotation of the rotary mirror 101 indicates a straight line that is parallel to the optical axis AC on the optical axis AC, as illustrated in FIG. 17, and the locus of the first condensing position that is formed on the observation object S also indicates a straight line that is parallel to the illumination optical axis AX. Therefore, the scanning device 100 can move the first condensing position in the illumination optical axis direction by rotating the rotary mirror 101 at a constant speed.

In the scanning device 100, similarly, the rotary mirror 101 can be rotated at a high speed. Accordingly, by employing an illumination device according to this embodiment that includes the scanning device 100, the first condensing position can be moved in the illumination optical axis direction at a further higher speed than the speed of the illumination device 10. In addition, the first condensing position can be moved in the illumination optical axis direction at a constant speed such that an integrated intensity distribution of illumination light applied to an illumination area has a higher uniformity in the illumination optical axis direction than the uniformity of the illumination device 10. Further, the locus of the first condensing position is moved by the scanning device 100 so as to be parallel to the illumination optical axis AX, and therefore the illumination range does not shift in the y-axis direction even when the first condensing position is moved by a long distance in the illumination optical axis direction. By doing this, an amount of illumination light to be shielded by the illumination field stop 39 can be reduced such that a high illumination efficiency can be achieved. Accordingly, by employing the microscope system according to this embodiment, an image in which variations in brightness in the illumination optical axis direction are further reduced can be acquired more efficiently in a shorter time.

Fifth Embodiment

Figure 18:
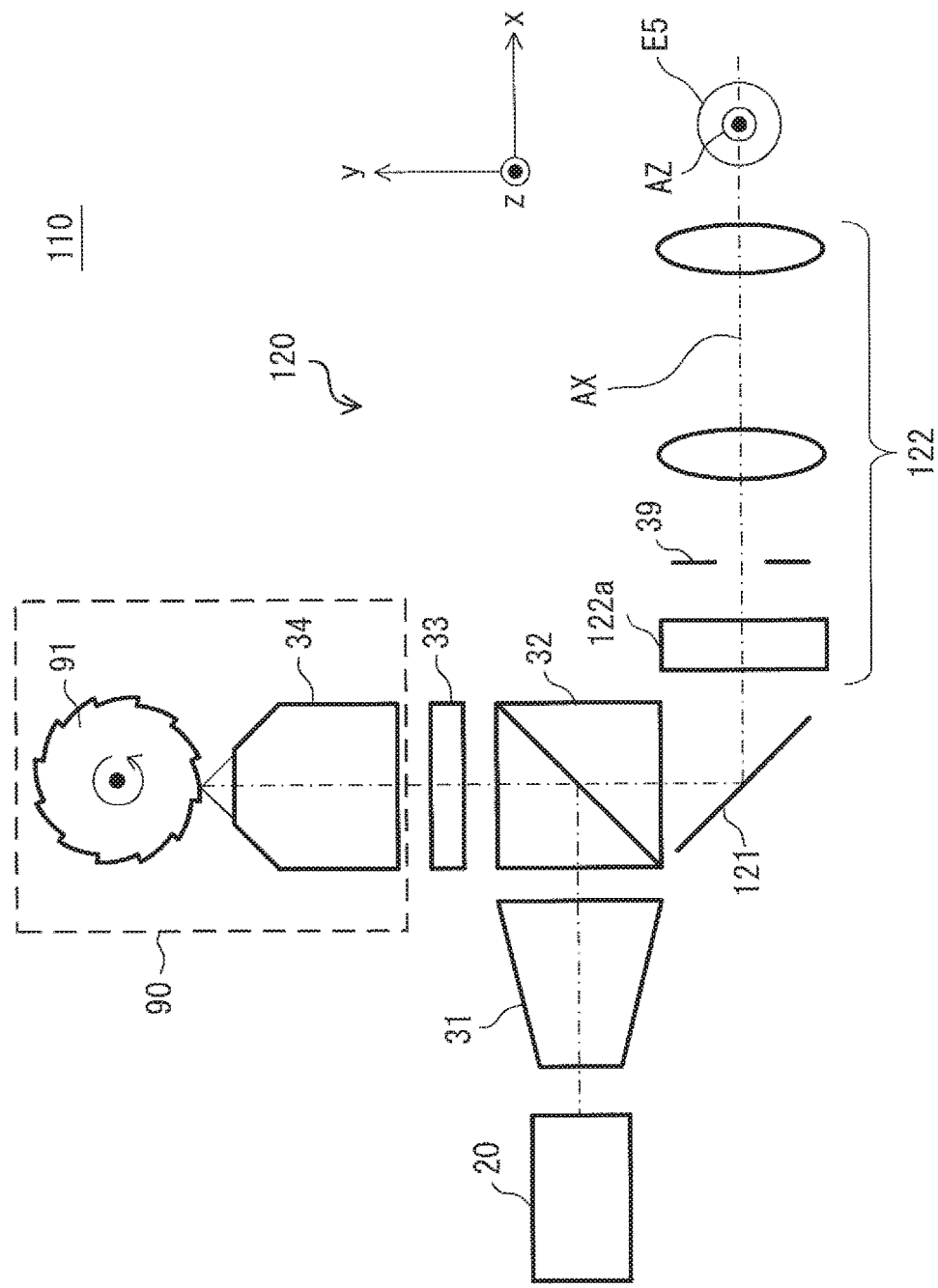
FIG. 18 illustrates the configuration of an illumination device 110.
Figure 19:
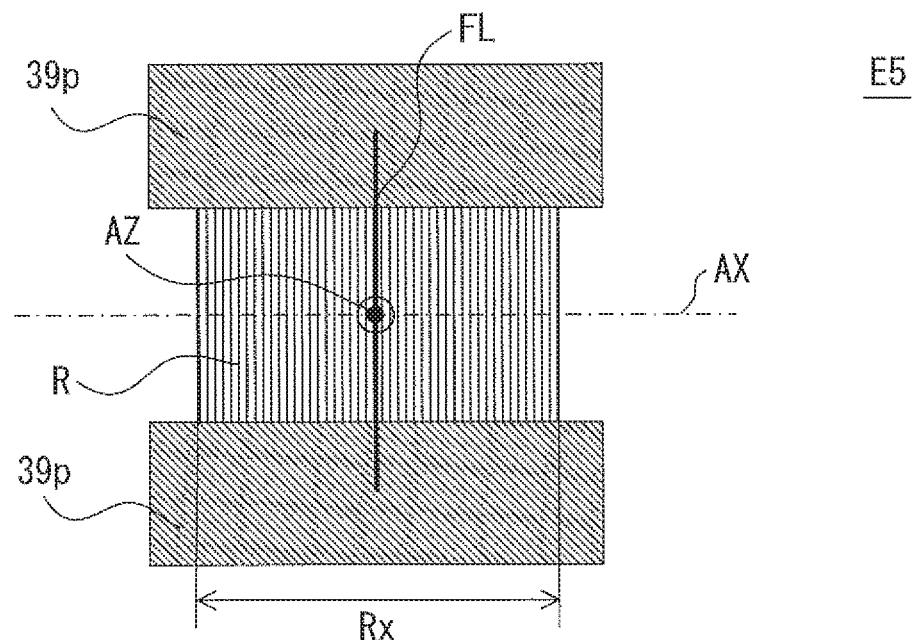
FIG. 19 is an enlarged view of area E5 illustrated in FIG. 18.

FIG. 18 illustrates the configuration of an illumination device 110. FIG. 19 is an enlarged view of area E5 illustrated in FIG. 18. A microscope system according to this embodiment is different from the microscope system 1 according to the first embodiment in that the illumination device 110 is included instead of the illumination device 10. The illumination device 110 is described below.

The illumination device 110 is a device that illuminates a cross section of the observation object S that crosses the observation optical axis AZ. The illumination device 110 is different from the illumination device 10 in that an illumination optical system 120 is included instead of the illumination optical system 30.

The illumination optical system 120 is different from the illumination optical system 30 in that a scanning device 90 is included instead of the scanning device 36, a mirror 121 is included instead of the scanning device 37, and a condenser optical system 122 is included instead of the condenser optical system 38. The configuration of the scanning device 90 has been described above in the third embodiment, and therefore the detailed description thereof is omitted.

The condenser optical system 122 includes a cylindrical lens 122a that has refractive power on the xz plane but does not have refractive power on the xy plane. Therefore, unlike the illumination optical system 30, the illumination optical system 120 condenses illumination light on a focal line FL that is parallel to the y-axis direction, as illustrated in FIG. 19. The illumination device 110 illuminates an illumination area R that is orthogonal to the observation optical axis AZ by causing the scanning device 90 to move the position (namely, the first condensing position) of the focal line FL in the illumination optical axis direction.

The illumination device 110 can move the first condensing position in the illumination optical axis direction at a substantially constant speed and at a higher speed than that of the illumination device 10. Accordingly, by employing a microscope system according to this embodiment that includes the illumination device 110, an image in which variations in brightness in the illumination optical axis direction are reduced can be acquired efficiently in a short time.

The embodiments described above give specific examples in order to make the invention easily understandable, and the embodiments of the present invention are not limited to the embodiments described above. Various modifications or variations can be made to the microscope device, the microscope system, and the illumination device without departing from the recitation of the claims. As an example, FIG. 18 illustrates an example in which the scanning device 90 is included as an example of an illumination device that condenses illumination light on the focal line FL. However, one of the scanning device 36, the scanning device 80, and the scanning device 100 may be included instead of the scanning device 90.

What is claimed is:

1. A microscope device comprising:
an illumination optical system that has an illumination optical axis and that irradiates an observation object with illumination light; and
an observation optical system that has an observation optical axis that has a direction different from the illumination optical axis and that projects an image of the observation object onto an imaging device, wherein
the illumination optical system includes a first scanning device that moves a condensing position in which the illumination light emitted from the illumination optical system is condensed in a direction that is substantially parallel to the illumination optical axis,
the first scanning device includes:
a rotary mirror that includes a reflection surface; and
a condenser lens that is arranged so as to irradiate the reflection surface with the illumination light and to receive the illumination light reflected by the reflection surface, and
the first scanning device rotationally moves or rotates the rotary mirror in such a way that a distance between the condenser lens and the reflection surface on an optical axis of the condenser lens changes.

2. The microscope device according to claim 1, wherein the condenser lens is arranged in such a way that the illumination light is condensed near the reflection surface.

3. The microscope device according to claim 1, wherein the first scanning device rotationally moves or rotates the rotary mirror at a constant speed.

4. The microscope device according to claim 2, wherein the first scanning device rotationally moves or rotates the rotary mirror at a constant speed.

5. The microscope device according to claim 1, wherein the rotary mirror is a galvanometer mirror.

6. The microscope device according to claim 2, wherein the rotary mirror is a galvanometer mirror.

7. The microscope device according to claim 1, wherein the rotary mirror includes a plurality of reflection surfaces.

8. The microscope device according to claim 2, wherein the rotary mirror includes a plurality of reflection surfaces.

9. The microscope device according to claim 1, wherein a direction of a rotation axis of the rotary mirror corresponds to a direction that is parallel to the observation optical axis.

10. The microscope device according to claim 2, wherein a direction of a rotation axis of the rotary mirror corresponds to a direction that is parallel to the observation optical axis.

11. The microscope device according to claim 3, wherein a direction of a rotation axis of the rotary mirror corresponds to a direction that is parallel to the observation optical axis.

12. The microscope device according to claim 4, wherein a direction of a rotation axis of the rotary mirror corresponds to a direction that is parallel to the observation optical axis.

13. The microscope device according to claim 1, wherein the illumination optical system further includes a second scanning device that moves the condensing position in a direction that is orthogonal to the illumination optical axis.

14. The microscope device according to claim 13, wherein
the second scanning device is a galvanometer mirror.

15. The microscope device according to claim 13, wherein
the second scanning device is a resonant scanner.

16. The microscope device according to claim 13, wherein
the illumination optical system further includes a stop that is arranged between the second scanning device and the condensing position.

17. The microscope device according to claim 13, wherein
the illumination optical axis is orthogonal to the observation optical axis, and
the second scanning device moves the condensing position in a direction that is orthogonal to the illumination optical axis and the observation optical axis.

18. The microscope device according to claim 17, further comprising:
an observation object movement device that moves the observation object in a direction that is parallel to the observation optical axis.

19. A microscope system comprising:
the microscope device according to claim 1; and
a computing device that generates image data of a three-dimensional image of the observation object in accordance with an image signal output from the imaging device, wherein
the microscope device further includes the imaging device that images the observation object and that outputs the image signal.

20. An illumination device comprising:
an illumination optical system that irradiates an observation object with illumination light, wherein
the illumination optical system includes a first scanning device that moves a condensing position in which the illumination light emitted from the illumination optical system is condensed in a direction that is substantially parallel to an illumination optical axis of the illumination optical system,
the first scanning device includes:
a rotary mirror that includes a reflection surface; and
a condenser lens that is arranged so as to irradiate the reflection surface with the illumination light and to receive the illumination light reflected by the reflection surface, and
the first scanning device rotationally moves or rotates the rotary mirror in such a way that a distance between the condenser lens and the reflection surface on an optical axis of the condenser lens changes.

* * * * *